United States Patent
Im et al.

(10) Patent No.: US 9,415,778 B2
(45) Date of Patent: Aug. 16, 2016

(54) APPARATUS AND METHOD FOR DETERMINING CARELESS DRIVING

(71) Applicant: Hyundai Motor Company, Seoul (KR)

(72) Inventors: Seong Su Im, Gyeonggi-do (KR); Jin Hak Kim, Gyeongg-do (KR); Byung Yong You, Gyeonggi-do (KR); Seok Youl Yang, Incheon (KR); Cheol Ha Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 184 days.

(21) Appl. No.: 14/099,029

(22) Filed: Dec. 6, 2013

(65) Prior Publication Data

US 2015/0081605 A1 Mar. 19, 2015

(30) Foreign Application Priority Data

Sep. 13, 2013 (KR) ........................ 10-2013-0110533

(51) Int. Cl.
- *B60W 40/09* (2012.01)
- *G06N 3/08* (2006.01)
- *B60W 50/00* (2006.01)

(52) U.S. Cl.
CPC ....... *B60W 40/09* (2013.01); *B60W 2050/0005* (2013.01); *B60W 2050/0045* (2013.01); *B60W 2510/205* (2013.01); *B60W 2540/18* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 4,724,939 A * | 2/1988 | Lockhart | F16H 61/143 192/103 F |
| 4,725,824 A * | 2/1988 | Yoshioka | G08B 21/06 340/575 |
| 5,483,446 A | 1/1996 | Momose et al. | |
| 5,642,093 A * | 6/1997 | Kinoshita | B60K 28/066 180/167 |
| 6,078,857 A * | 6/2000 | Jung | G05B 13/0285 706/20 |
| 6,487,500 B2 | 11/2002 | Lemelson et al. | |
| 2007/0280505 A1* | 12/2007 | Breed | G01G 23/3728 382/104 |

(Continued)

FOREIGN PATENT DOCUMENTS

JP 2007-272834 A 10/2007
JP 2010072953 A 4/2010

(Continued)

OTHER PUBLICATIONS

MacAdam, C. et al. (1998). "Using neural networks to identify driving style and headway control behavior of drivers." Vehicle System Dynamics 29.S1: 143-160.*

(Continued)

*Primary Examiner* — Stanley K Hill
*Assistant Examiner* — Benjamin Buss
(74) *Attorney, Agent, or Firm* — Mintz Levin Cohn Ferris Glovsky and Popeo, P.C.; Peter F. Corless

(57) ABSTRACT

An apparatus and a method for determining careless driving are provided and determine more reliable careless driving by generating normal driving patterns using driving performance data for a reference time at the beginning of driving. In addition, careless driving patterns greater than a predetermined number are detected using the normal driving pattern and a boundary between the normal driving and the careless driving is determined using a supervised learning method. The careless driving of the driver is then determined based on the determined boundary.

17 Claims, 4 Drawing Sheets

(56) References Cited

U.S. PATENT DOCUMENTS

| | | | | |
|---|---|---|---|---|
| 2010/0023223 | A1* | 1/2010 | Huang | B60W 40/09 701/44 |
| 2010/0036290 | A1 | 2/2010 | Noguchi et al. | |
| 2011/0153532 | A1* | 6/2011 | Kuge | B60W 40/09 706/12 |
| 2011/0288712 | A1* | 11/2011 | Wang | B60K 6/445 903/902 |
| 2013/0088369 | A1* | 4/2013 | Yu | G08B 21/06 340/905 |
| 2014/0081563 | A1* | 3/2014 | Wang | B60W 50/0097 903/902 |

FOREIGN PATENT DOCUMENTS

| | | |
|---|---|---|
| JP | 2012-048310 A | 3/2012 |
| KR | 97-0009794 | 6/1997 |
| KR | 10-2009-0091335 | 8/2009 |
| KR | 10-2013-0039203 A | 4/2013 |

OTHER PUBLICATIONS

Friedrichs, F. et al. (2010). "Drowsiness monitoring by steering and lane data based features under real driving conditions." Proceedings of the European Signal Processing Conference, Aalborg, Denmark. vol. 2327. 5 pages.*

Gaillard, C-L. (2006). "An analysis of the impact of modularization and standardization of vehicles electronics architecture on the automotive industry." Thesis (S.M.)—Massachusetts Institute of Technology, System Design and Management Program, 120 pages. http://hdl.handle.net/1721.1/34674.*

Murphey, Y.L. et al. (2009). "Drivers style classification using jerk analysis." Computational Intelligence in Vehicles and Vehicular Systems, 2009. CIVVS'09. IEEE Workshop on. IEEE, 2009. DOI:10.1109/CIVVS.2009.4938719.*

Pilutti, T. et al. (1999). "Identification of Driver State for Lane-Keeping Tasks." IEEE Trans. on Systems, Man, and Cybernetics—Part A: Systems and Humans, vol. 29, No. 5, Sep. 1999. pp. 486-502.*

* cited by examiner

APPARATUS AND METHOD FOR DETERMINING CARELESS DRIVING

CROSS-REFERENCE TO RELATED APPLICATION

This application is based on and claims priority from Korean Patent Application No. 10-2013-0110533, filed on Sep. 13, 2013 in the Korean Intellectual Property Office, the disclosure of which is incorporated herein in its entirety by reference.

BACKGROUND

1. Field of the Invention

The present invention relates to an apparatus and a method for determining careless driving, and more particularly, to a technology of determining careless driving of a driver by detecting careless driving patterns of the driver based on normal driving patterns of the driver and then determining careless driving of the driver using the careless driving patterns.

2. Description of the Prior Art

Research for detecting careless driving of a driver by analyzing driving performance data of a vehicle has been conducted. Most research has used a method of inducing careless driving by allowing a driver to perform a specific task and then learning patterns, such as steering and deceleration and acceleration, in advance. In other words, this is a method that allows a driver to intentionally perform the careless driving to determine different careless driving patterns of each driver.

However, when the method is actually applied to a vehicle, the driver needs to perform the careless driving to determine the driving performance data for the careless driving pattern. Therefore, it may be difficult to allow the driver to intentionally perform the careless driving. Further, a careless driving alarming system applied to a vehicle does not perform a learning of the careless driving patterns or learns only natural driving patterns (e.g., normal driving patterns) for about the initial 10 to 15 minutes and does not separately learn the careless driving patterns even though the driver intends the learning. Additionally, in the method of learning only the normal driving patterns, it may be difficult to find a boundary which differentiates the normal driving and the careless driving, as compared to a method of learning the normal driving patterns and the careless driving patterns together.

SUMMARY

Accordingly, the present invention provides an apparatus and a method for determining careless driving that determines more reliable careless driving by generating normal driving patterns using driving performance data for a reference time at the beginning of driving, detecting careless driving patterns greater than a predetermined number using the normal driving pattern, determining a boundary between the normal driving and the careless driving using a supervised learning method, and determining the careless driving of the driver based on the decided boundary.

In one aspect of the present invention, an apparatus for determining careless driving may include a plurality of units executed by a controller. The plurality of units may include: a driving performance data collection unit configured to collect driving performance data; a driving pattern generation unit configured to generate driving patterns using the collected driving performance data; a storage unit configured to store normal driving patterns and careless driving patterns; a careless driving pattern detection unit configured to detect the careless driving patterns among the driving patterns transferred from the driving pattern generation unit, based on the normal driving patterns and store the detected careless driving patterns in the storage unit; a boundary decision unit configured to determine boundary values between the normal driving patterns and the careless driving patterns using an artificial neural network (ANN) technique; a careless driving determination unit configured to determine whether the driving patterns in a threshold time unit transferred from the driving pattern generation unit are the careless driving patterns, based on the decided boundary values; and a controller configured to operate the driving pattern generation unit to store the driving patterns generated within a reference time at the start of driving in the storage unit as the normal driving patterns, transfer driving patterns generated after the storage of the normal driving patterns is completed to the careless driving pattern detection unit, and transfer driving patterns generated after the careless driving patterns greater than a predetermined number are detected to the careless driving determination unit.

In another aspect of the present invention, a method for determining careless driving may include: collecting, by a controller, driving performance data; storing, by the controller, driving patterns generated within a reference time at the start of driving in a storage unit as normal driving patterns; detecting, by the controller, careless driving patterns among the driving patterns, based on the normal driving patterns; determining, by the controller, boundary values between the normal driving patterns and the careless driving patterns using an artificial neural network (ANN) technique; detecting, by the controller, driving patterns generated after the careless driving patterns greater than a predetermined number; and determining, by the controller, whether driving patterns in a threshold time unit are the careless driving patterns, based on the boundary values.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
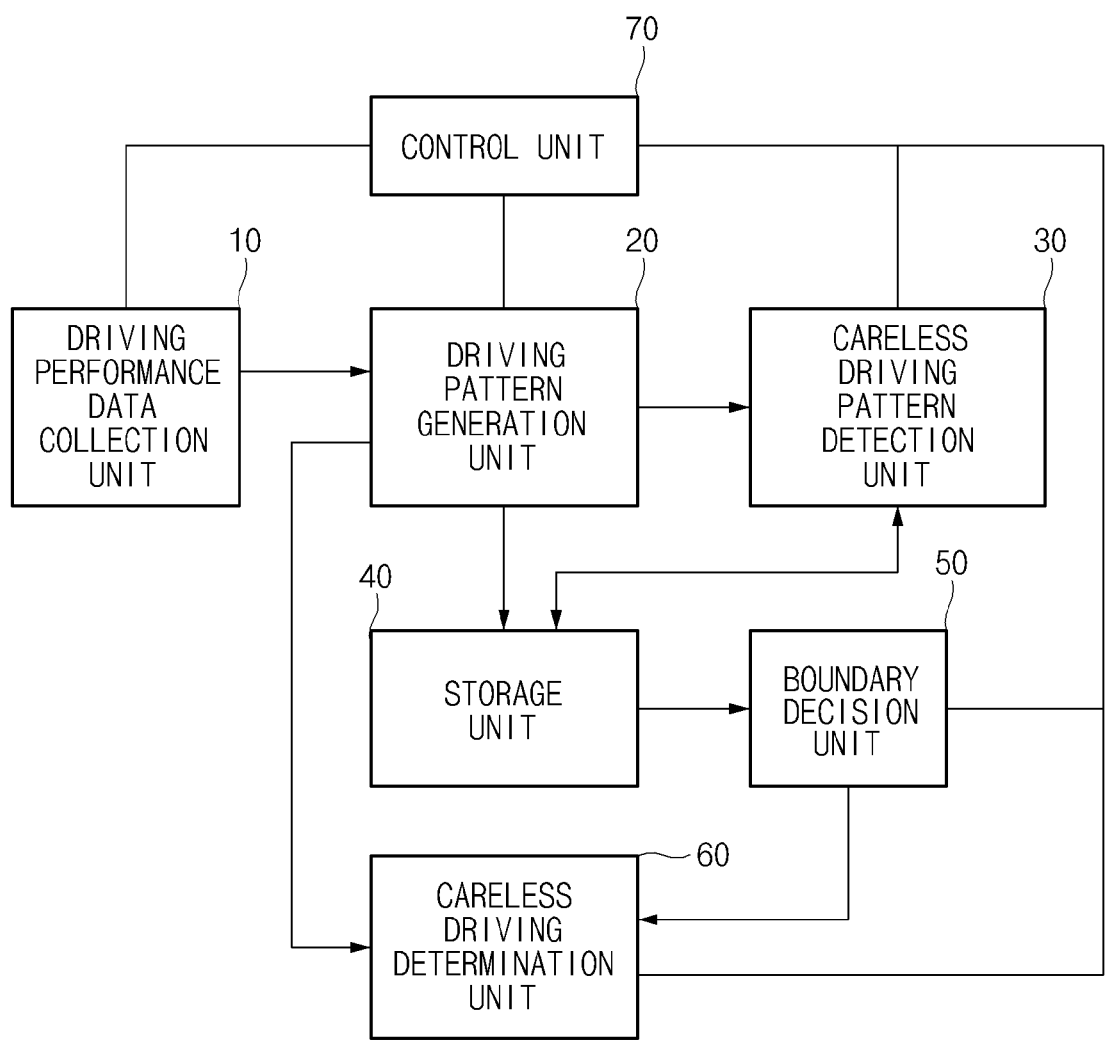
FIG. 1 is an exemplary diagram of an apparatus for determining careless driving according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

FIG. 1 is an exemplary diagram of an apparatus for determining careless driving according to an exemplary embodiment of the present invention. As illustrated in FIG. 1, the apparatus for determining careless driving may include a plurality of units executed by a controller 70. The plurality of units may include a driving performance data collection unit 10, a driving pattern generation unit 20, a careless driving pattern detection unit 30, a storage unit 40, a boundary decision unit 50, and a careless driving determination unit 60.

In particular, the driving performance data collection unit 10 may be configured to collect various types of driving performance data through a vehicle network. The driving performance data may include longitudinal (e.g., a driving direction of a vehicle) data and lateral (e.g., a vertical direction of the driving direction of the vehicle) data. An example of the lateral data may include steering angles and steering speeds. In this configuration, the vehicle network may include a controller area network (CAN), a local interconnect network (LIN), FlexRay, media oriented system transport (MOST), and the like. The driving performance data collection unit 10 may be configured to directly collect the steering angles and the steering speeds from motor driven power steering (MDPS). Further, the driving performance data collection unit 10 may be operated with an electronic controller (ECU) to directly collect the steering angles and the steering speeds.

Additionally, the driving pattern generation unit 20 may be configured to generate driving patterns in a threshold time unit using the driving performance data collected by the driving performance data collection unit 10. In other words, the driving pattern generation unit 20 may be configured to calculate a dispersion of the steering angles and an average of the steering speeds based on the steering angles and the steering speeds collected by the driving performance data collection unit 10 and then generate the driving patterns for the steering angles and the steering speeds by applying a Gaussian Mixture Model (GMM). Herein, the GMM is a generally widely used technology and the detailed description thereof will be omitted.

The driving pattern generation unit 20 may be configured to perform the following operation under the control of the controller 70. First, the driving pattern generation unit 20 may be configured to store the driving patterns of a driver generated at a beginning (e.g., 10 minutes) of the driving of the vehicle as a normal driving pattern. This may be a process of generating the normal driving pattern. Further, the driving pattern generation unit 20 may be configured to transfer driving patterns generated after storing the normal driving (e.g., not careless driving such as when the driver is distracted) patterns is completed to the careless driving pattern detection unit 30. The transferred driving patterns may be used to detect the careless driving pattern.

Furthermore, the driving pattern generation unit 20 may be configured to transfer the driving patterns generated after the careless driving patterns greater than a predetermined number are detected to the careless driving pattern determination unit 60. The transferred driving patterns may be used to detect the careless driving patterns. Next, the careless driving pattern detection unit 30 may be configured to detect the careless driving patterns from the driving patterns transferred from the driving pattern generation unit 20 based on the normal driving patterns stored in the storage unit 40. In particular, the careless driving pattern detection unit 30 may be configured to use a Mahalanobis distance to detect driving patterns that exceed a first threshold value as the careless driving patterns.

Additionally, the careless driving pattern detection unit 30 may be configured to store the detected careless driving patterns in the storage unit 40. In particular, the careless driving pattern detection unit 30 may be configured to perform a process of detecting the careless driving patterns until the careless driving patterns above the reference number are detected. The storage unit 40 may be configured to store the normal driving patterns generated by the driving pattern generation unit 20 and the careless driving patterns detected by the careless driving pattern detection unit 30. The boundary decision unit 50 may be configured to determine a boundary between the normal driving patterns and the careless driving patterns based on the normal driving patterns and the careless driving patterns stored in the storage unit 40.

Figure 2A:
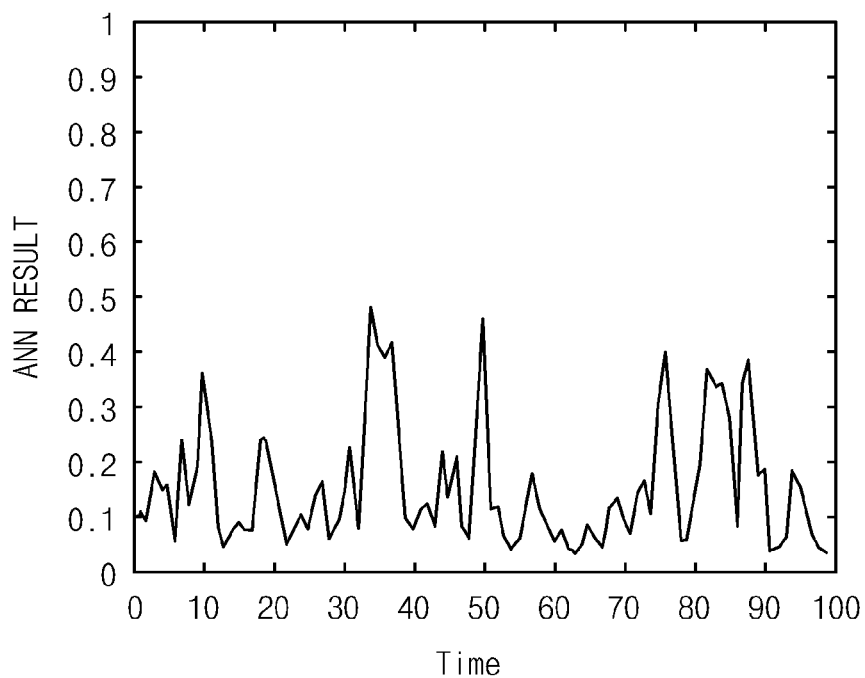
FIGS. 2A and 2B are exemplary diagrams describing a process of determining a boundary between normal driving patterns and careless driving patterns according to an exemplary embodiment of the present invention.
Figure 2B:
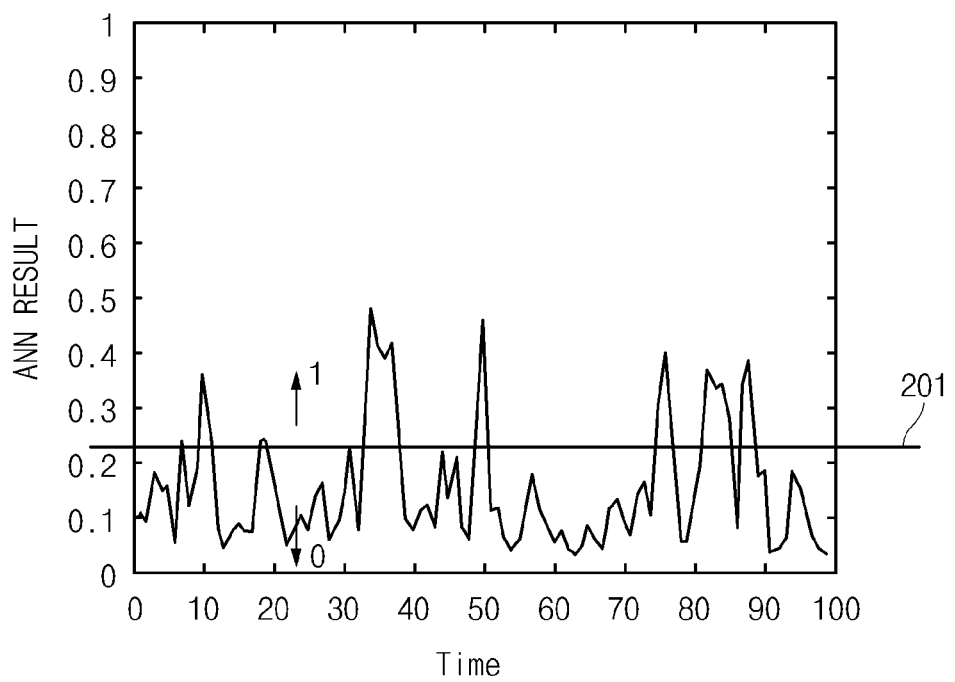

Hereinafter, referring to FIGS. 2A and 2B, a process of allowing the boundary decision unit 50 to determine the boundary between the normal driving patterns and the careless driving patterns will be described in detail. FIG. 2A is an exemplary diagram illustrating results obtained by applying an artificial neural network (ANN) technique to the careless driving patterns according to the exemplary embodiment of the present invention. In particular, the ANN technique is a type of the supervised learning method.

First, as an input of the ANN, the dispersion of the steering angles and the average of the steering speeds that correspond to the careless driving patterns may be used. Further, the learning may be performed by marking a targeted value of the ANN for the input as [1, 0] for the careless driving and as [0, 1] for the normal driving. In other words, when the test is performed after the learning, as the first value of the two output values approaches 1, the test represents the careless driving and as the first value of the two output values approaches 0, the test represents the careless driving. For example, the first value in [M, N] that represents the two output values means an M value.

In FIG. 2A, an X axis represents time and a y axis represents a first value M of the two output values of the ANN. In particular, the first output may be changed over time even though the driving patterns are the careless driving patterns since when the time is divided into a substantially small time unit even though the careless driving is continuously performed, the controller may be configured to perform the normal driving for a portion of the substantially small time unit. The boundary decision unit 50 may be configured to calculate the average using the ANN results as illustrated in FIG. 2A and determine the average of the calculated ANN results as the boundary between the normal driving patterns and the careless driving patterns. The decided boundary value 201 is as illustrated in FIG. 2B.

Further, the careless driving determination unit 60 may be configured to determine that the driving patterns in the threshold time unit which are transferred from the driving pattern generation unit 20 are the careless driving patterns, based on the boundary values between the normal driving patterns and the careless driving patterns which are determined by the boundary decision unit 50. In other words, the careless driving determination unit 60 may be configured to determine the driving of the driver as the careless driving when a ratio of the ANN result values that exceed the boundary values exceeds a second threshold value (e.g., about 20% or 40%). In particular, the careless driving determination unit 60 may include a first calculator (not illustrated) configured to calculate the ANN result value by applying the ANN technique to the driving patterns generated by the driving pattern generation unit 20 and a determiner (not illustrated) configured to determine the driving of the driver as the careless driving when the ratio of the ANN result values that exceeds the boundary values exceeds the second threshold value.

Additionally, the controller 70 may be configured to perform the overall operation to allow each component to normally perform respective functions. In particular, the controller 70 may be configured to operate the driving pattern generation unit 20 to store the driving patterns of the driver generated at the beginning (e.g., about 10 minutes) of the driving of the vehicle in the storage unit 40 as the normal driving patterns. Further, the controller 70 may be configured to operate the driving pattern generation unit 20 to transfer the driving patterns generated after the storage of the normal driving patterns is completed to the careless driving pattern detection unit 30. The controller 70 may be configured to operate the driving pattern generation unit 20 to transfer the driving patterns generated after the careless driving patterns greater than the reference number are detected to the careless driving determination unit 60.

Meanwhile, according to the apparatus for determining careless driving, even in the method for using the careless driving patterns together and the method for using only the normal driving patterns, the detection performance may be based on how to set the threshold value of the Mahalanobis distance that represents a difference between a data distribution of the normal driving patterns and a data distribution of test patterns (driving patterns of a current driver). For the evaluation, a task of performing the careless driving, such as continuous character transmission for a predetermined time (e.g., about 100 seconds) and device operation within a vehicle and a task of performing the normal driving for a predetermined time may be repeatedly performed several times for each driver. A performance analysis graph thereof is as illustrated in FIG. 3.

Figure 3:
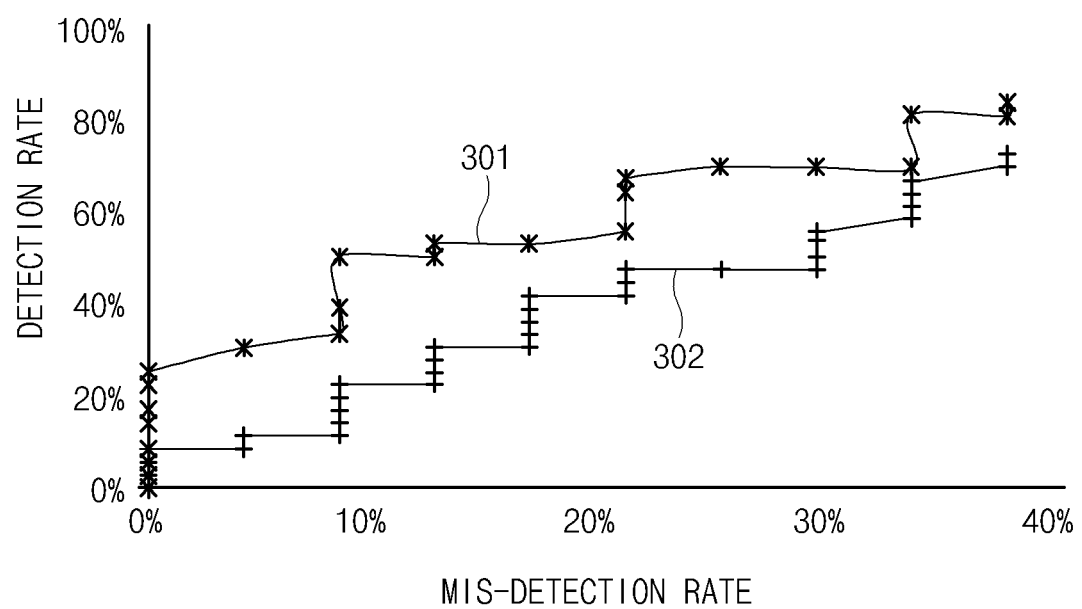
FIG. 3 is an exemplary performance analysis diagram of the apparatus for determining careless driving according to the exemplary embodiment of the present invention.

As illustrated in FIG. 3, in a careless detection graph 301 in which both the normal driving patterns and the careless driving patterns are learned and a careless detection graph 302 in which only the normal driving patterns are learned, a change in a detection rate varies based on the change in the Mahalanobis distance and a change in a misdetection rate varies based on the change in the second threshold value. Additionally, FIG. 3 illustrates an improved performance since the careless detection graph 301 in which both the normal driving patterns and the careless driving patterns are learned is positioned at upper left compared to the careless detection graph 302 in which only the normal driving patterns are learned. In other words, it may be confirmed that the misdetection rate for the same detection performance target is substantially small or the higher detection rate for the same misdetection rate target performance is represented.

Figure 4:
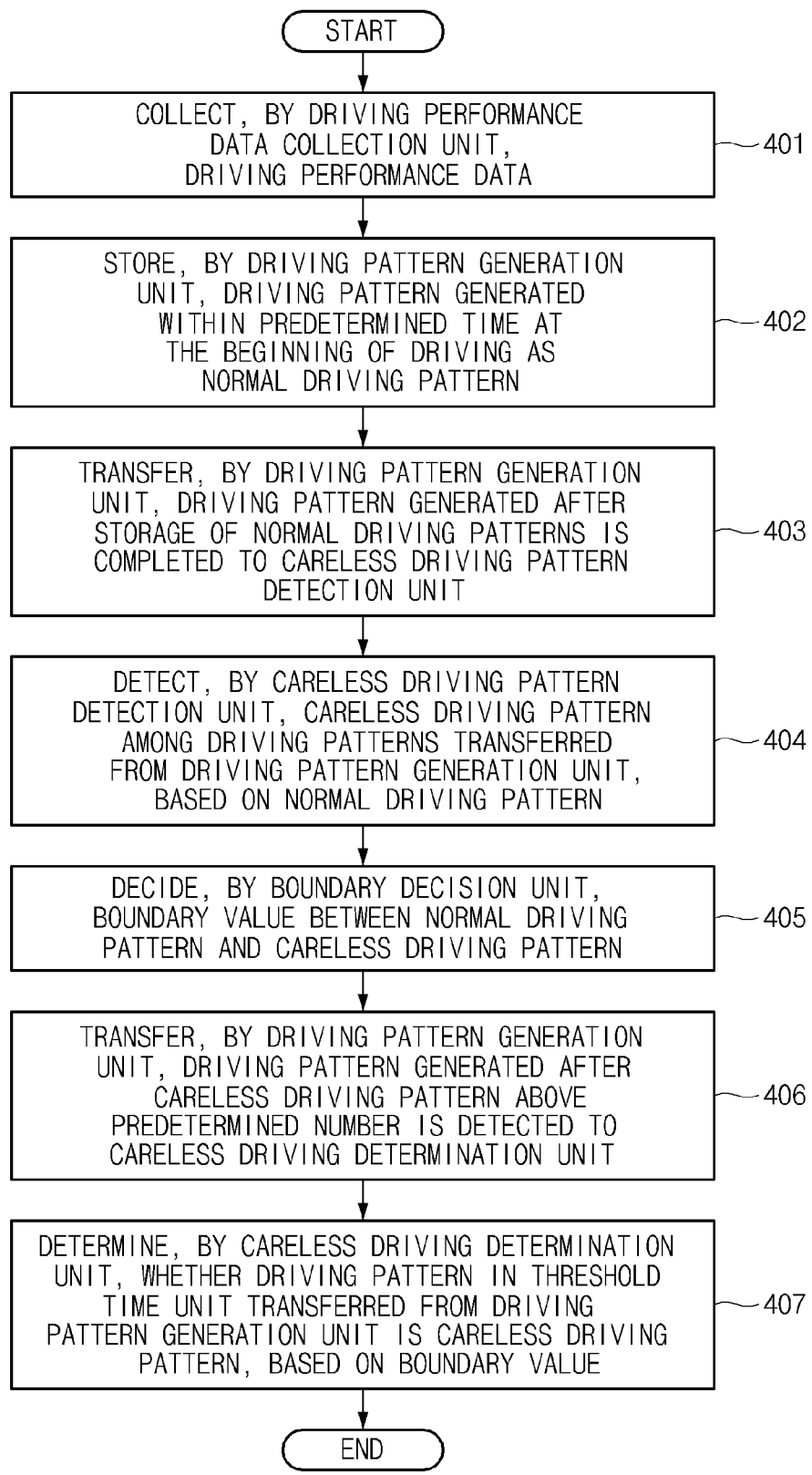
FIG. 4 is an exemplary flow chart of a method for determining careless driving according to the exemplary embodiment of the present invention.

FIG. 4 is an exemplary flow chart of a method for determining careless driving according to the exemplary embodiment of the present invention. First, the driving performance data collection unit 10 may be configured to collect the driving performance data (401). The driving pattern generation unit 20 may be configured to store the driving patterns generated within the reference time at the beginning of the driving in the storage unit 40 as the normal driving patterns (402). In addition, the driving pattern generation unit 20 may be configured to transfer the driving patterns generated after the storage of the normal driving patterns is completed to the careless driving pattern detection unit 30 (403).

Further, the careless driving pattern detection unit 30 may be configured to detect the careless driving patterns from the driving patterns transferred from the driving pattern generation unit 20 based on the normal driving patterns (404). The boundary decision unit 50 may be configured to use the artificial neural network (ANN) technique to decide the boundary values between the normal driving patterns and the careless driving patterns (405). The driving pattern generation unit 20 may be configured to transfer the driving patterns generated after the careless driving patterns greater than the predetermined number are detected to the careless driving determination unit 60 (406). The careless driving determination unit 60 may be configured to determine whether the driving pattern within the threshold time transferred from the driving pattern generation unit 20 is the careless driving pattern, based on the boundary values (407).

As set forth above, according to the exemplary embodiments of the present invention, it may be possible to determine the highly reliable careless driving by generating the normal driving patterns using the driving performance data for the reference time at the beginning of driving, detecting the careless driving patterns greater than the predetermined number using the normal driving pattern, deciding the boundary between the normal driving and the careless driving using the supervised learning method, and determining the careless driving of the driver based on the decided boundary.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. An apparatus for determining careless driving, comprising:
    a memory configured to store program instructions; and
    a processor configured to execute the program instructions, the program instructions when executed configured to:
        collect driving performance data;
        generate a plurality of driving patterns using the collected driving performance data;
        store first driving patterns generated within a reference time at a beginning of driving as normal driving patterns;
        detect careless driving patterns from second driving patterns, based on the normal driving patterns and store the detected careless driving patterns;
        decide boundary values between the normal driving patterns and the careless driving patterns using an artificial neural network (ANN) technique;
        if a predetermined number of the careless patters are detected from the second driving patters, determine whether third driving patterns within a threshold time unit are careless driving patterns, based on the decided boundary values; and
        if the predetermined number of the careless patterns are not detected from the second driving patterns, determine whether the second driving patterns are normal driving patterns or careless driving patterns based on the normal driving patterns from the first driving patterns,
        wherein the plurality of driving patterns include the first driving patterns, the second driving patterns, and the third driving patterns, and
        wherein the second driving patterns are generated after the first driving patterns, and the third driving patterns are generated if the predetermined number of the careless patterns are detected from the second driving patterns.

2. The apparatus for determining careless driving according to claim 1, wherein the driving performance data are a steering angle and a steering speed.

3. The apparatus for determining careless driving according to claim 1, wherein a Mahalanobis distance is used to detect the second driving patterns that exceed a first threshold value as the careless driving patterns.

4. The apparatus for determining careless driving according to claim 1, wherein the program instructions when executed are further configured to determine an average of ANN result values as the boundary values between the normal driving patterns and the careless driving patterns.

5. The apparatus for determining careless driving according to claim 4, wherein the program instructions when executed are further configured to determine the third driving patterns as the careless driving patterns when a ratio of the ANN result values exceeding the boundary values exceeds a second threshold value.

6. The apparatus for determining careless driving according to claim 5, wherein the program instructions when executed are further configured to:
    calculate the ANN result values by applying the ANN technique to the third driving patterns; and
    determine the third driving patterns are the careless driving patterns when the ratio of the ANN result values exceeding the boundary values exceeds the second threshold value.

7. The apparatus for determining careless driving according to claim 1, wherein the program instructions when executed are further configured to collect the driving performance data via a vehicle network selected from a group consisting of: a controller area network (CAN), a local interconnect network (LIN), FlexRay, and media oriented system transport (MOST).

8. A method for determining careless driving, comprising:
    collecting, by a controller, driving performance data;
    storing, by the controller, first driving patterns generated within a reference time at a beginning of driving as normal driving patterns;
    detecting, by the controller careless driving patterns, based on the normal driving patterns, from second driving patterns generated after storing the first driving patterns as the normal driving patterns;
    determining, by the controller, boundary values between the normal driving patterns and the careless driving patterns using an artificial neural network (ANN) technique; and
    determining, by the controller, whether third driving patterns within a threshold time unit are careless driving patterns, based on the boundary values if a predetermined numbers of the careless patterns are detected from the second driving patterns,
    determine whether the second driving patterns are normal driving patterns or careless driving patterns based on the normal driving patterns from the first diving patterns if the predetermined number of the careless patterns are not detected from the second driving patterns,
    wherein the second driving patterns are generated after the first driving patterns, and the third driving patterns are generated if the predetermined number of the careless patterns are detected from the second driving patterns.

9. The method for determining careless driving according to claim 8, wherein the driving performance data are a steering angle and a steering speed.

10. The method for determining careless driving according to claim 8, wherein in detecting the careless driving patterns, a Mahalanobis distance is used to detect the second driving patterns that exceed a first threshold value as the careless driving patterns.

11. The method for determining careless driving according to claim 8, wherein in determining the boundary, an average of ANN result values is decided as the boundary values between the normal driving patterns and the careless driving patterns.

12. The method for determining careless driving according to claim 11, wherein in determining the careless driving, is the third driving patterns are determined as the careless driving patterns when a ratio of the ANN result values exceeding the boundary values exceeds a second threshold value.

13. A non-transitory computer readable medium containing program instructions executed by a controller, the computer readable medium comprising:
    program instructions that collect driving performance data;
    program instructions that store first driving patterns generated within a reference time at a beginning of driving as normal driving patterns;
    program instructions that detect careless driving patterns, based on the normal driving patterns, from second driving patterns generated after storing the first driving patterns as the normal driving patterns;

program instructions that determine boundary values between the normal driving patterns and the careless driving patterns using an artificial neural network (ANN) technique;

program instructions that determine whether third driving patterns within a threshold time unit are the careless driving patterns, based on the boundary values if a predetermined number of the careless patterns are detected from the second driving patterns; and program instructions that determine whether the second driving patterns are normal driving patterns or careless driving patterns based on the normal driving patterns from the first driving patters if the predetermined number of the careless patterns are not detected from the second driving patterns, wherein the second driving patterns are generated after the first driving patterns, and the third driving patterns are generated if the predetermined number of the careless patterns are detected from the second driving patterns.

14. The non-transitory computer readable medium of claim 13, wherein the driving performance data are a steering angle and a steering speed.

15. The non-transitory computer readable medium of claim 13, wherein a Mahalanobis distance is used to detect the second driving patterns that exceed a first threshold value as the careless driving patterns.

16. The non-transitory computer readable medium of claim 13, further comprising:

program instructions that decide an average of ANN result values as the boundary values between the normal driving patterns and the careless driving patterns.

17. The non-transitory computer readable medium of claim 16, further comprising:

program instructions that determine as the third driving patterns are the careless driving patterns when a ratio of the ANN result values exceeding the boundary values exceeds a second threshold value.

\* \* \* \* \*